W. G. VIALL.
COMMUTATOR.
APPLICATION FILED AUG. 12, 1912.
1,060,722.
Patented May 6, 1913.
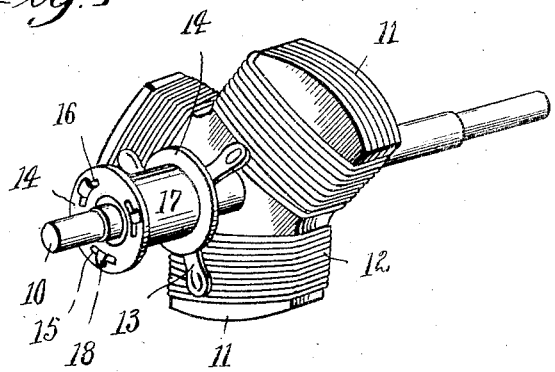
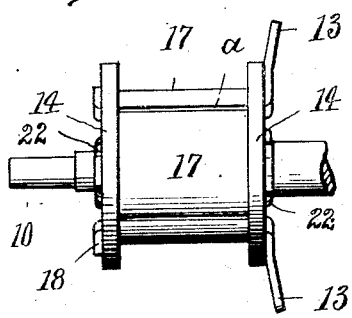
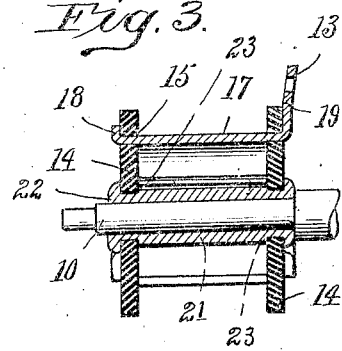
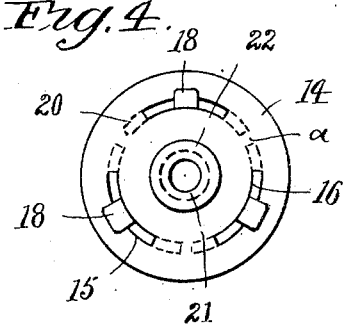
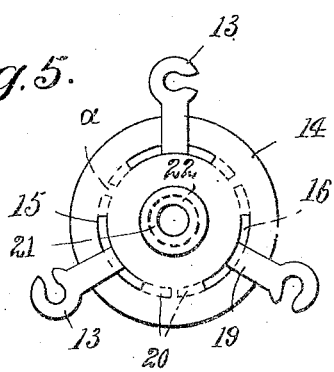
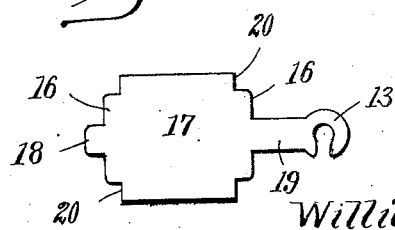
Witnesses
Mildred Macleod
Ivan L. Morehouse
Inventor
William G. Viall
By Chamberlain & Newman
Attorneys

UNITED STATES PATENT OFFICE.

WILLIAM G. VIALL, OF BRIDGEPORT, CONNECTICUT, ASSIGNOR TO THE IVES MANUFACTURING CORPORATION, OF BRIDGEPORT, CONNECTICUT, A CORPORATION OF CONNECTICUT.

COMMUTATOR.

1,060,722.  Specification of Letters Patent.  Patented May 6, 1913.

Application filed August 12, 1912.  Serial No. 714,550.

*To all whom it may concern:*

Be it known that I, WILLIAM G. VIALL, citizen of the United States, and resident of Bridgeport, in the county of Fairfield and State of Connecticut, have invented certain new and useful Improvements in Commutators, of which the following is a specification.

My invention relates to improvements in commutators and refers particularly to that class of commutators shown and described in my prior Patent #1,018,141.

The object of the invention is to improve upon commutators by producing a simplified and inexpensive form of device which is made of a very small number of sheet metal and other stamped parts of insulating material as for instance fiber in a manner which will permit the same to be readily assembled and secured together in a simple and practical way; to design and arrange the parts so that when assembled, there will be a clear space $a$ between the edge portions of the commutator segments, and further so that an open hollow space $b$ will be formed within the hub produced by the assembled segments.

The invention further resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings, forming a part of this specification, and upon which, Figure 1, shows a perspective view of my improved form of commutator shown attached to the shaft of a rotary armature. Fig. 2, is an enlarged side view of the said commutator, shown mounted upon a portion of the shaft seen in Fig. 1. Fig. 3, is a central vertical longitudinal section through the commutators shown in Figs. 1 and 2. Fig. 4, is an end view of the commutator, as seen from the left in Fig. 2. Fig. 5, is an end view of the same commutator, as seen from the right of Fig. 2, and Fig. 6, is a detached plan view of one of the metal segment blades for connecting the insulating end flanges of the commutator as will later be more fully explained.

Referring in detail to the characters of reference marked upon the drawings, 10 represents an ordinary motor shaft, and 11 the rotary armature mounted thereon having the usual or any preferred form of windings 12, wound upon the several arms of the armature and having the ends of the respective windings secured to the terminals 13 of the commutator. The commutator is formed separate and independent of the armature or its shaft and is secured to the latter by being forced and frictionally held thereon.

The commutator shown in the drawings is formed of six pieces, three sheet metal members 17, two insulating disks 14 and a bushing 21. The insulating disks form the end flanges of the spool, and are alike in construction, and have a central hole to receive the before mentioned bushing 21 through which the shaft 10 extends, and also a series of arc shaped slots 15 serve to receive the end portions 16—16 of the sheet metal segments 17. These segments are made of sheet metal and when blanked out are also stamped to curve the same so that their end portions will register with the curved slots in the insulating disks and so that when the several metal segments are assembled between the said disks they will form a hollow cylindrical or hub portion intermediate of said disks. Said segments are alike in size and construction and by result of the equally spaced distances $a$, between the curved slots 15 in the insulating disks 14, said segments are made to register one with the other to form a hollow cylinder, the adjacent edge portions being spaced one from the other to insure each segment forming an entirely separate and independent metal and electrical contact for the brushes of the motor. The projected end portion 18 of the respective segments 17 are turned out and over upon the outer sides of the said disks, while the shanks 19 extending from the opposite end portion of the segments are similarly bent out and down upon the side face of the other fiber insulating disk. The bending over of these two extensions serves to firmly set the insulating disk up against the shoulders 20 of the ends of the segments, thereby firmly securing the several parts together. The extreme end of the extension 19 of the segments serves as the terminal 13 with which the ends of the wire windings are securely connected.

The bushing 21 is shouldered as at 23 to sit against the disks 14, and when assembled the outer ends of the bushing are turned over upon the face of the disks to form a flange 22 to more securely hold the parts in position. The hole through the bushing serves to accommodate the motor shaft to which it may be held by friction or other suitable means.

Having thus described my invention what I claim and desire to secure by Letters Patent is:—

1. A commutator comprising a pair of end disks of insulating material with a central hole therethrough, and having a series of arc shaped slots, curved sheet metal segments having their ends fitted in the slots of the disks and having extensions passed through the said slots of the disks and bent over upon the outside to securely hold the parts together, said segments being separated one from the other in a way to form an open space between the adjacent edge portions of the segments to prevent dirt from lodging therein.

2. A commutator comprising a pair of insulating disks having a series of arc shaped slots therein curved sheet metal segments having their ends fitted in the slots of the disks and having extensions passed through the said slots and bent over upon the outside to securely hold the parts together, said segments being separated one from the other in a way to form an open space between the adjacent edge portions of the segments and likewise a central hollow space within the hub or cylinder formed by the segments.

Signed at Bridgeport in the county of Fairfield and State of Connecticut this 7th day of August, A. D. 1912.

WILLIAM G. VIALL.

Witnesses:
C. M. NEWMAN,
RUTH M. WORDEN.